United States Patent
Ohrloff et al.

(10) Patent No.: US 8,974,885 B2
(45) Date of Patent: Mar. 10, 2015

(54) STRUCTURAL ELEMENT FOR REINFORCING A FUSELAGE OF AN AIRCRAFT

(75) Inventors: Nikolaus Ohrloff, Buxtehude (DE); Thomas Beumler, Jork (DE); Derk Daverschot, Bremen (DE); Matthijs Plokker, Harsefeld (DE)

(73) Assignee: Airbus Operations GmbH, Hamburg (DE)

( * ) Notice: Subject to any disclaimer, the term of this patent is extended or adjusted under 35 U.S.C. 154(b) by 179 days.

(21) Appl. No.: 13/081,943

(22) Filed: Apr. 7, 2011

(65) Prior Publication Data

US 2011/0236711 A1    Sep. 29, 2011

Related U.S. Application Data

(63) Continuation of application No. PCT/EP2009/062979, filed on Oct. 6, 2009.

(60) Provisional application No. 61/104,849, filed on Oct. 13, 2008.

(30) Foreign Application Priority Data

Oct. 13, 2008    (DE) .......................... 10 2008 042 782

(51) Int. Cl.
  *B32B 3/00*    (2006.01)
  *B32B 5/00*    (2006.01)
  (Continued)

(52) U.S. Cl.
  CPC . *B64C 1/065* (2013.01); *B64C 1/12* (2013.01); *B64C 2001/0072* (2013.01); *Y02T 50/433* (2013.01); *Y02T 50/43* (2013.01)
  USPC .......... 428/98; 428/172; 244/119; 244/123.1; 244/123.5; 244/124

(58) Field of Classification Search
  CPC .. B64C 1/065; B64C 1/12; B64C 2001/0072; Y02T 50/43; Y02T 50/433; B32B 7/08; B32B 7/12; B32B 5/22; B32B 5/24; B32B 5/26

USPC ................... 428/98, 458, 463, 594, 626, 172; 244/119, 123.1, 123.5, 124
See application file for complete search history.

(56) References Cited

U.S. PATENT DOCUMENTS 5,866,272 A  *  2/1999  Westre et al. ................. 428/593
6,648,273 B2 * 11/2003  Anast ............................ 244/119
(Continued)

FOREIGN PATENT DOCUMENTS

EP       1 291 279 A2    3/2003
EP       1 495 858 A1    1/2005
WO    WO 2008/033017 A1  3/2008

OTHER PUBLICATIONS

International Search Report for International Application Serial No. PCT/EP2009/062979 dated Oct. 6, 2009.
(Continued)

*Primary Examiner* — Donald J Loney
(74) *Attorney, Agent, or Firm* — Jenkins, Wilson, Taylor & Hunt, P.A.

(57) ABSTRACT

A structural element for reinforcing a fuselage cell of an aircraft is provided. The structural element comprises a reinforcement profile which is made in one piece from a metallic material. The profile is provided with a strap at least in regions. As a result of the strap which is made of a fiber-reinforced layer material or fiber metal laminate and is adhesively bonded, at least in regions, to a flange of the reinforcement profile the structural element has high damage tolerance and advantageous fatigue properties. The fiber metal laminate or layer material is made of a plurality of metal layers and fiber-reinforced plastics material layers which are stacked in alternating fashion and adhesively bonded to one another over the entire surface. The reinforcement profile and the strap are joined by means of a joining layer. Said joining layer is preferably constructed from two prepreg layers and a non-fiber-reinforced adhesive layer.

11 Claims, 3 Drawing Sheets

(51) Int. Cl.
   *B64C 1/00* (2006.01)
   *B64C 1/06* (2006.01)
   *B64C 1/12* (2006.01)

(56) References Cited

U.S. PATENT DOCUMENTS

| | | |
|---|---|---|
| 7,080,805 B2 | 7/2006 | Prichard et al. |
| 7,285,326 B2 | 10/2007 | Schmidt et al. |
| 2003/0168555 A1* | 9/2003 | Livi et al. .................. 244/132 |
| 2005/0112348 A1* | 5/2005 | Schmidt et al. ........... 428/292.1 |
| 2006/0038071 A1* | 2/2006 | Schoene .................. 244/118.6 |

OTHER PUBLICATIONS

Chinese Office Action for Application No. 200980140736.6 dated Feb. 16, 2013.

* cited by examiner

STRUCTURAL ELEMENT FOR REINFORCING A FUSELAGE OF AN AIRCRAFT

CROSS-REFERENCE TO RELATED APPLICATIONS

This application is a continuation of PCT/EP2009/062979 filed Oct. 6, 2009 and claims the benefit of and priority to U.S. Provisional Application No. 61/104,849, filed Oct. 13, 2008 and German Patent Application No. 10 2008 042 782.9, filed Oct. 13, 2008, the entire disclosures of which are herein incorporated by reference.

FIELD OF THE INVENTION

The invention relates to a structural element for reinforcing a fuselage of an aircraft, the structural element comprising a reinforcement profile which is made in one piece from a metallic material, in particular an aluminium alloy material or a titanium alloy material.

A fuselage cell of an aircraft is generally made of a plurality of barrel-shaped fuselage sections which are arranged one behind the other and connected by transverse seams. Each fuselage section is reinforced by a plurality of annular formers, the outer faces of which are planked with a fuselage cell skin. To further increase the stability of the fuselage sections, a plurality of reinforcement profiles are arranged on the inner face of the fuselage cell skin and extend parallel to one another in each case in the longitudinal direction of the fuselage section. The reinforcement profiles are also usually arranged distributed over the periphery of the fuselage section with uniform spacing from one another.

Extreme loading occurs in a central portion of the fuselage cell in the region of the formers in which the aerofoils are connected to the fuselage cell structure. Even higher loads occur in particular types of aircraft, for example in the case of high-wing transport aircraft, in which the undercarriage is arranged underneath the fuselage cell in the region of the central portion of the fuselage. With this type of aircraft, strong buckling of the central portion of the fuselage occurs during each landing procedure, leading to extremely high peak loads, particularly in the annular formers which are present in said central portion.

Formers and other reinforcement profiles which are used in particular to reinforce the central portion of the fuselage in such aircraft types must consequently have high fatigue resistance over a plurality of load cycles and also damage tolerance properties when cracks occur. In this context, the term damage tolerance means that the occurrence of a crack does not lead to the immediate failure of the component and the growth of a crack, if not completely halted, is at least slowed.

A basic possibility for decreasing the speed of crack growth in components which are exposed to high mechanical stresses is to increase the material thickness. However, this leads to a usually untenable increase in weight of reinforcement profiles such as formers and supports.

SUMMARY OF THE INVENTION

An object of the invention is therefore to provide a reinforcement profile, in particular a former or a support for reinforcing a fuselage cell structure in a region of an aircraft fuselage cell which is exposed to high mechanical stresses, which reinforcement profile also exhibits only slowed crack growth over a plurality of load cycles and thus has high damage tolerance.

Providing the reinforcement profile with a strap, at least in regions, results in high damage tolerance and also advantageous fatigue behaviour. The growth, for example owing to high mechanical stresses, of any cracks which occur is at least significantly reduced, if not halted altogether, by the additionally applied strap. The reinforcement profile is in particular a former or former segment or a straight support, which are used in particular in said regions of the fuselage cell which are exposed to high mechanical stresses.

An advantageous development of the structural element provides that the strap is adhesively bonded to the reinforcement profile by means of a joining layer. This preferably results in adhesive bonding between the strap and the reinforcement profile over the entire surface, resulting in high damage tolerance.

According to a further advantageous development of the structural element, the strap is riveted and/or screwed to the reinforcement profile, at least in regions. As a result of this configuration, the strap is prevented from becoming detached from the reinforcement profile. For, if the strap were to become detached from the reinforcement profile, even if only in regions, the damage tolerance properties of the reinforcement profile would be suddenly reduced.

A further advantageous configuration of the structural element provides that the strap is made of a layer material, in particular of a fibre metal laminate, comprising a plurality of metal layers and plastics material layers arranged one on top of another, the metal layers and plastic material layers being alternated in each case.

In the case of a reinforcement profile made of an aluminium alloy material, the strap can in principle be made of a high-strength aluminium alloy, a titanium alloy or a fibre metal laminate, such as for example Glare®. A fibre metal laminate or layer material of this type is produced from a plurality of thin metal sheets or foils made of an aluminium alloy material which are stacked on top of one another and adhesively bonded to one another over the entire surface in each case by glass-fibre-reinforced epoxy resin layers having a low thickness. In the case of a reinforcement profile made of a titanium alloy material the strap can also be made of a fibre metal laminate which is constructed from titanium sheets and titanium foils such as "TiGR" or "TiGra" ("titanium graphite" fibre metal laminate) which are stacked in alternating fashion and adhesively bonded by carbon-fibre-reinforced epoxy resin layers.

However, extensive loading tests carried out by the applicant on reinforcement profiles provided with straps showed that the damage tolerance properties which can be achieved using an adhesively bonded strap made of a fibre metal laminate, such as Glare®, cannot be achieved by applying straps made of aluminium or titanium. Also in the case of reinforcement profiles made of a titanium alloy material, the damage tolerance properties can be significantly improved by adhesively bonding straps made of the above-mentioned fibre metal laminate "TiGr" or "TiGra" to said reinforcement profiles.

According to a further advantageous configuration of the structural element, the metal layers are made of an aluminium alloy and the plastics material layers are made of a glass-fibre-reinforced thermosetting plastics material.

As a result of the layers made of an aluminium alloy and the layers made of a glass-fibre-reinforced thermosetting plastics material stacked in alternating fashion, the layer material or fibre metal laminate exhibits excellent fatigue behaviour and also high damage tolerance. Adding glass fibres prevents in particular corrosion problems between the aluminium layers.

A further advantageous development of the structural element provides that the metal layers are made of a titanium alloy and the plastics material layers are made of a carbon-fibre-reinforced thermosetting plastics material, in particular an epoxy resin.

Reinforcement profiles such as for example former segments or supports which are produced for example from a titanium alloy material can be reinforced by adhesively bonding thereto a strap which is constructed from a plurality of layers made of titanium alloy material which are stacked and adhesively bonded in each case over the entire surface by carbon-fibre-reinforced layers of a thermosetting plastics material, in particular an epoxy resin.

A further advantageous development of the structural element provides that a material thickness of the strap decreases at least towards one end of the strap. This prevents notch stresses from arising in a tapered or connection region of the strap.

A further advantageous configuration of the reinforcement profile provides that the joining layer is made of at least one adhesive layer and at least one prepreg layer. This results in a particularly close bond between the reinforcement profile and the strap which is adhesively bonded thereto. The strap is generally adhesively bonded to the reinforcement profile in an autoclave in an additional production step with simultaneous use of pressure and temperature.

According to a further configuration, it is provided that the at least one adhesive layer is made of a thermosetting plastics material, in particular an epoxy resin, and the at least one prepreg layer is made of a fibre-reinforced thermosetting plastics material, in particular a glass-fibre-reinforced and/or a carbon-fibre-reinforced epoxy resin.

The quality of the joining layer is further improved by combining a compact adhesive layer with a least one prepreg layer. As a result of this construction of the adhesive layer, controlled and moderated delamination is firstly achieved in the event of the formation of a crack in the former. The initiation of a crack in the strap is also delayed. In order to achieve these advantageous effects, the glass fibres preferably extend transverse to the path of the crack and parallel to the main load direction. The less delamination occurs, the more residual load-bearing capacity of the former remains.

Further advantageous configurations of the structural element are set out in the following claims.

DESCRIPTION OF EXEMPLARY EMBODIMENTS

Figure 1:
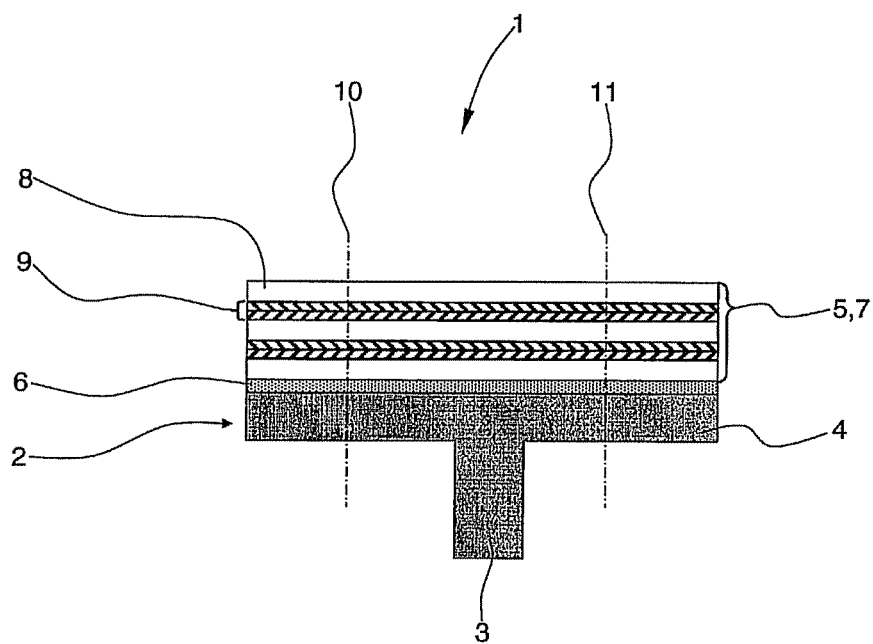
FIG. 1 is a schematic cross-sectional view through the structural element according to the invention.

In the drawings, like reference numerals denote like constructional elements in each case.

FIG. 1 is a schematic cross-section through the structural element according to the invention.

A structural element 1 comprises, inter alia, a reinforcement profile 2 which in FIG. 1 is configured, by way of example, as a former segment 3 for reinforcing a fuselage cell (not shown) of an aircraft. The former segment 3 is produced from a suitable high-strength aluminium alloy material and has a double-T-shaped cross-sectional geometry. Alternatively the former segment 3 can have a U-shaped or L-shaped cross-sectional geometry. The former segment 3 can for example be fashioned out of the solid aluminium alloy material in one piece by milling, forging or extruding. According to the invention, an inner flange 4 of the former segment 3 is bonded to a strap 5 over the entire surface. According to the invention, the strap 5 ideally almost stops the propagation of cracks within the inner flange.

The strap 5 is adhesively bonded over the entire surface to the inner flange 4 of the former segment 3 by means of a joining layer 6. In the case of a former segment 3 which is made of an aluminium alloy, the strap 5 itself is preferably made of a layer material 7 or a fibre metal laminate such as, for example, Glare®.

In the case of a former 3 or former segment made of a titanium alloy, the strap 5 can alternatively be made of a fibre metal laminate such as "TiGr" or "TiGra" which is constructed from a succession of layers of titanium foils and titanium sheets, which are adhesively bonded to one another over the entire surface in each case by a carbon-fibre-reinforced epoxy resin.

In the example illustrated, the layer material 7 comprises three thin metal layers and three thin plastics material layers which are adhesively bonded to one another over the entire surface in each case. One metal layer 8 and one plastics material layer 9 among the layers are provided with a reference numeral and are representative of the rest. The metal layers and plastics material layers are alternated within the layer material 7, the upper face and lower face of the layer material preferably terminating in a metal layer. In this case, the number of plastics material layers is always 1 less than the number of metal layers. The foil-like metal layers having a low material thickness are made for example of an aluminium alloy, while the thin plastics material layers are constructed from a glass-fibre-reinforced thermosetting plastics material. For example, epoxy resin has proved to be a suitable thermosetting plastics material. In the representation of FIG. 1, the glass fibres within the plastics material layers extend perpendicular to the plane of the drawing, i.e. in the peripheral direction of the former segment 3, since the relevant loads determined by the configuration occur in this direction.

The layer material 7 is prefabricated in an autoclave with simultaneous use of pressure and temperature and is brought to a predetermined specified size by milling. The layer material 7 prefabricated in this way can optionally have a surface geometry which is curved at least unidimensionally, for example in order to make stressless adhesive bonding to curved annular former segments possible. The strap 5 can further have a continuously decreasing material thickness at the end thereof in order to provide a taper and reduce the occurrence of notch stresses in the connection region to the inner flange 4 of the former segment 3. Since the strap 5 is preferably adhesively bonded to the former segment 3 in an autoclave with simultaneous use of pressure and/or temperature, the strap 5 can also be adapted by bending during the bonding process in the autoclave, at least if the material thickness of the strap 5 is not too high. In order to prevent the strap 5 from becoming detached from the inner flange 4, connecting elements 10, 11, in particular rivets or screws, are provided in regions.

Figure 2:
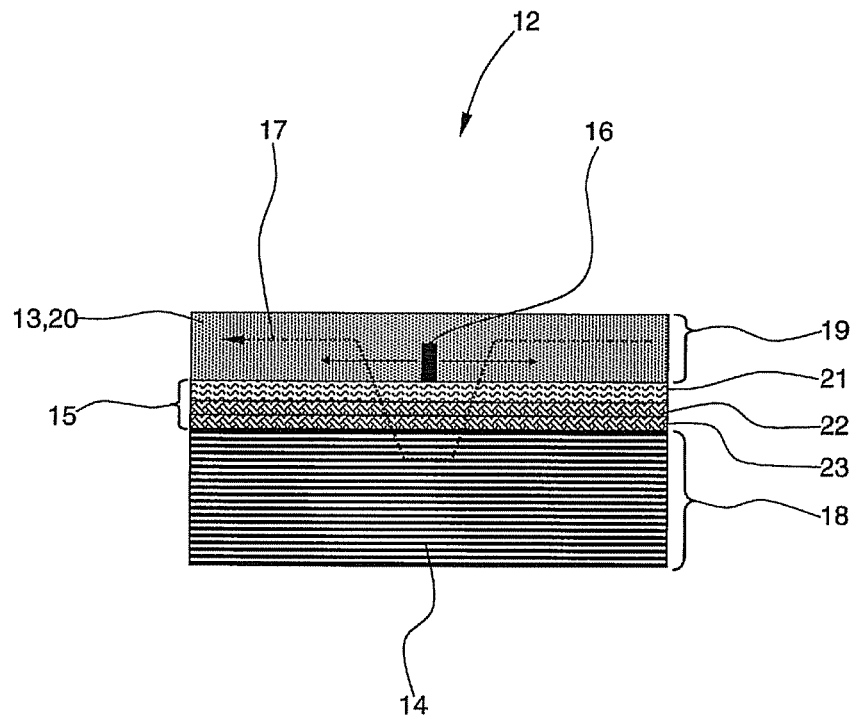
FIG. 2 is a basic representation of the mode of operation of the damage-tolerant structural element.

FIG. 2 is a schematic illustration of the principle of operation of the structural element according to the invention.

A structural element 12 is made of a reinforcement profile 13 to which a strap 14 is adhesively bonded over the entire surface by means of a joining layer 15. Similarly to the strap 5 illustrated in FIG. 1, the strap 14 is also constructed from a layer material or fibre metal laminate. A force flux 17, with which a crack 16 interferes, is introduced into the strap 14 from the reinforcement profile 13 via the joining layer 15 and is guided back over the crack 16 and into the structural element 13 by the strap 14. The crack 16 has not yet completely penetrated the reinforcement profile 13. As a result, the strap 14 acts as a bridge over the crack 16 for the force flux 17, whereby growth of the crack 16 is at least slowed, if not completely stopped. The two small black arrows pointing in opposite directions on each side of the crack 16 indicate the movement tendency, caused by the crack 16, of the portions of the reinforcement profile 13 which are situated adjacent to the crack 16 on either side. A material thickness 18 of the strap 14 preferably approximately corresponds to 0.5 to 3 times a material thickness 19 of the reinforcement profile 13 or the inner flange 20 of the reinforcement profile 13.

The joining layer 15 preferably consists of a pure adhesive layer 21 and at least two prepreg layers 22, 23, the adhesive layer 21 directly contacting the reinforcement profile 13 and the lower prepreg layer 23 being connected to the strap 14. The adhesive layer 21 is formed, for example, from an epoxy resin without fibre reinforcement, while the two prepreg layers 22, 23 are constructed from an epoxy resin which is reinforced with carbon fibres and/or glass fibres.

Figure 3:
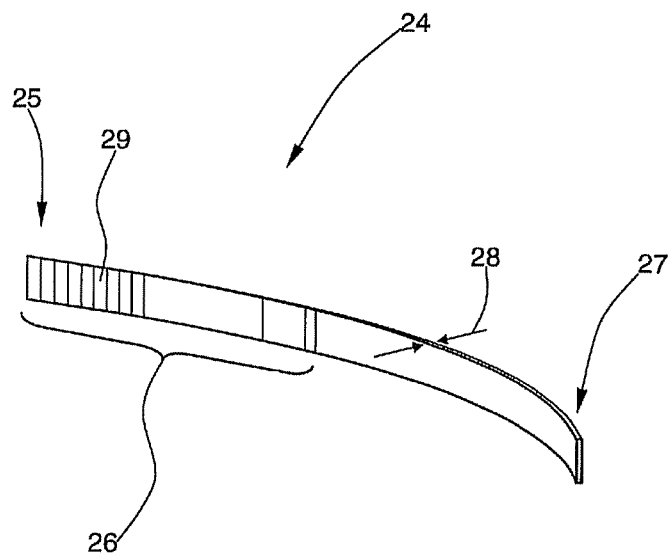
FIG. 3 shows an embodiment of a strap.

FIG. 3 illustrates a technical embodiment of a strap for providing the structural element according to the invention.

A strap 24 which according to the invention is made of a layer material or a fibre metal laminate has a taper 26 at a first end 25 thereof, while a second end 27 of the strap 24, which end points in the opposite direction, has a blunt end. That is to say, a material thickness 28 of the strap 24 decreases stepwise towards the first end 25, the taper 26 comprising a plurality of steps, of which one step 29 is provided with a reference numeral and is representative of all the rest. A step height corresponds approximately to the respective thickness of the plastics material layers and metal layers used to form the layer material of the strap 24.

Figure 4:
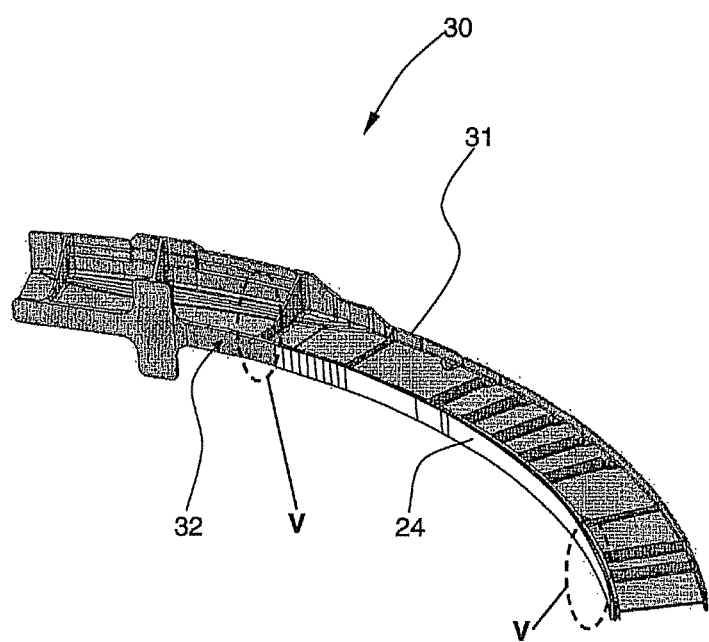
FIG. 4 shows a reinforcement profile in the form of a former segment, to the inner flange of which the strap according to FIG. 3 is adhesively bonded.

FIG. 4 shows a structural element 30 which is made of a curved former segment 31 as a reinforcement profile, to the inner flange 32 of which the strap 24 has preferably been adhesively bonded over the entire surface. The former segment 31 has an approximately double-T-shaped cross-sectional geometry.

Figure 5:
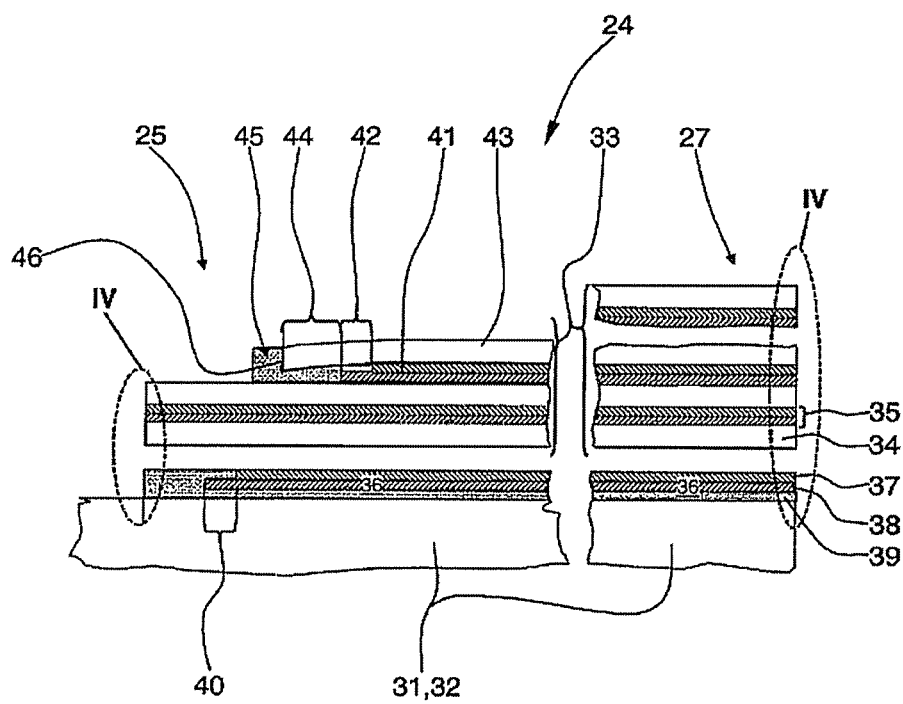
FIG. 5 is a detailed sectional view through two end regions of the strap according to FIG. 3.

FIG. 5 is a detailed cross-sectional view of the two end regions V of the strap 24 from FIG. 4.

The strap 24 is constructed in accordance with the above-described straps from a layer material 33 or a fibre metal laminate which is constructed of metal layers and plastics material layers which are stacked one on top of another in alternating fashion and adhesively bonded to one another over the entire surface. From among the metal layers and plastics material layers, a continuous lower metal layer 34 and a plastics material layer 35 lying thereon are provided with reference numerals and are representative of all other layers. All of the plastics material layers consist in each case of two layers (not provided with a reference numeral) in which the glass fibres embedded in the synthetic resin matrix can extend in the same direction or in different directions.

In principle, at least in the case of curved former segments 31, the glass fibres used to reinforce the plastics material layers extend parallel to the peripheral direction thereof, since the greatest mechanical stresses occur in this spatial orientation. In general, the glass fibres in the layer material are arranged so as to optimise force flux.

A joining layer 36 which comprises two prepreg layers 37, 38 and an adhesive layer 39 extends underneath the metal layer 34. The inner flange 32 of the former segment 31 is located underneath the adhesive layer 39.

Between the ends (not provided with a reference numeral) of the two prepreg layers 37, 38, there is a small offset 40, i.e. the prepreg layers 37, 38 have slightly different lengths. This offset 40 is surrounded by the adhesive layer 39 in such a way that the end portions of the prepreg layers 37, 38 do not taper off in an exposed manner but instead terminate in an "end piece" made of pure, i.e. non-fibre-reinforced, synthetic resin or the synthetic resin used to form the adhesive layer 39. The metal layer 34 is shown offset from the joining layer 36 in the vertical direction merely in order to improve the overview of the drawing; in reality said joining layer is adhesively bonded to said metal layer over the entire surface. A further plastics material layer 41 also has a slight offset 42. A further metal layer 43 is adhesively bonded to the plastics material layer 41, which metal layer is slightly bent or curved downwards out of the horizontal position by a small amount in an end portion thereof (not provided with a reference numeral) as a result of the autoclave pressure during the bonding process. The downwardly curved end portion of the metal layer 43 projects past an end of the plastics material layer 41—including the offset 42—by a small projecting length 44. A region 45 located directly underneath the projecting length 44 and next to an (end) edge 46 of the metal layer 43 is filled with a synthetic resin material to form a surround. This synthetic resin material is preferably also used for the adhesive layer 39 within the joining layer 36. Surrounding the edges of the metal layer 43 and the plastics material layer 41 in this way means that the edge 46 of the metal layer 43 and the end of the plastics material layer 41 are also completely embedded in the synthetic resin material and do not end or taper off in an "exposed" manner, the strap 24 thus being joined to the inner flange 32 in an optimal manner. As a result, a "metal-metal bond" having advantageous crack initiation behaviour is thus achieved in the region of the taper 26 and in the transition between the strap 24 and the former 31 as well as within the layer material or fibre metal laminate of the strap 24.

Figure 6:
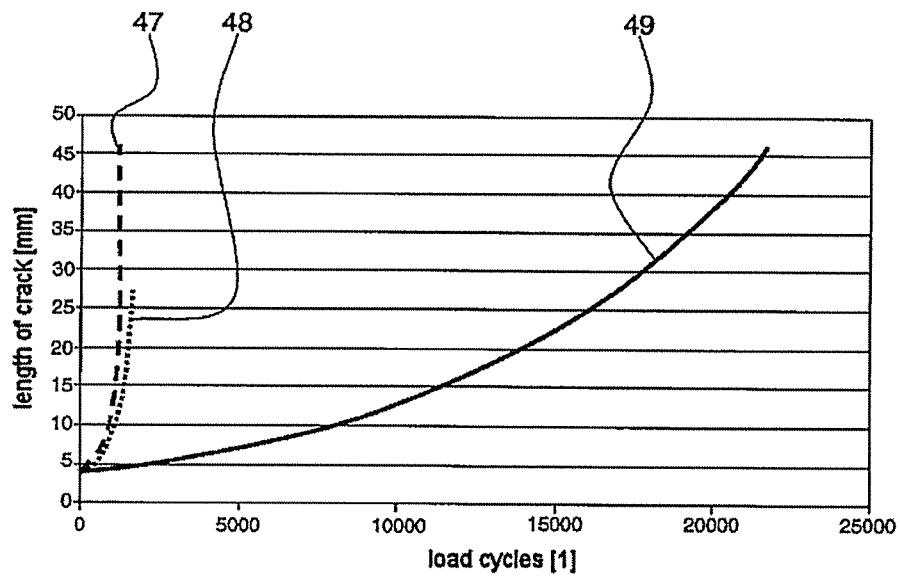
FIG. 6 is a graph comparing the damage tolerance effect of three different strap materials in principle.

FIG. 6 is a graph comprising three curves. A respective crack length in millimetres in the aluminium former is plotted on the y-axis, while the number of load cycles acting on a structural element being considered in each case is shown on the x-axis. The structural element is once again an aluminium former used as a reinforcement profile. The mechanical stress in the aluminium former is the same in all three curves.

For the representation, an (initial) crack approximately 4 mm in length was introduced into the reinforcement profile of the structural element by way of a trial and the enlargement thereof was measured or calculated as a function of the number of load cycles acting thereon and plotted on the graph.

A dashed curve 47 reflects the (calculated) enlargement of the length of the crack in the case of an unstrapped aluminium former, while the dotted line 48 represents the (calculated) progression which occurs when a titanium strap which is riveted to an aluminium former is used. The (measured) curve 49 shown by a continuous line occurs when the strap which is adhesively bonded to the aluminium former is made of a layer material such as, for example, Glare®. It is clear that by using a strap made of the layer material used according to the invention the enlargement or growth of a crack is slowed to a great extent and does not reach critical values, even when a very high number of load cycles act on it.

The structural element which is formed according to the invention with additionally applied straps made of a layer material or a fibre metal laminate thus achieves an extremely high level of damage tolerance, in such a way that it is predestined in particular for use in highly-stressed regions of the fuselage cell structure, for example in a central portion of the fuselage cell of a high-wing aircraft.

List of Reference Numerals 1 structural element
2 reinforcement profile
3 former segment
4 inner flange (former segment)
5 strap
6 joining layer
7 layer material (prefabricated fibre metal laminate)
8 metal layer
9 plastics material layer
10 rivet
11 rivet
12 structural element
13 reinforcement profile
14 strap
15 joining layer
16 crack
17 force flux
18 material thickness (strap)
19 material thickness (reinforcement profile and flange)
20 flange (reinforcement profile)
21 adhesive layer
22 prepreg layer
23 prepreg layer
24 strap
25 first end (strap)
26 taper
27 second end (strap)
28 material thickness (strap)
29 step
30 structural element
31 former segment
32 inner flange
33 layer material
34 metal layer
35 plastics material layer
36 joining layer
37 prepreg layer
38 prepreg layer
39 adhesive layer
40 offset
41 plastics material layer
42 offset
43 metal layer
44 projecting length
45 region
46 edge
47 curve (unstrapped aluminium former)
48 curve (aluminium former with titanium strap)
49 curve (aluminium former with fibre metal laminate strap)

The invention claimed is:

1. A structural element for reinforcing a fuselage cell of an aircraft, comprising:
  a reinforcement profile made in one piece from a metallic material,
  wherein the reinforcement profile is provided with a strap, and the strap arranged on the inner face of the fuselage skin at least in regions,
  wherein the strap comprises a layer material comprising at least a plurality of layers of said metallic material and a plurality of fibre reinforced plastic material layers arranged one on top of the other, and being alternated, and
  wherein the reinforcement profile is a support and the strap is adhesively bonded, at least in regions, to a flange of the support.

2. The structural element according to claim 1, wherein the strap is adhesively bonded to the reinforcement profile by means of a joining layer.

3. The structural element according to claim 1, wherein the strap is riveted and/or screwed to the reinforcement profile at least in regions.

4. The structural element according to claim 1, wherein the metallic material is made of an aluminum alloy and the plurality of fiber reinforced plastic material layers are made of a glass-fibre-reinforced thermosetting plastic material.

5. The structural element according to claim 1, wherein the metallic material is made of a titanium alloy and the plurality of fiber reinforced plastic material layers are made of a carbon-fibre-reinforced thermosetting plastic material.

6. The structural element according to claim 1, wherein a material thickness of the strap decreases at least towards one end of the strap.

7. The structural element according to claim 2, wherein the joining layer is made of at least one adhesive layer and at least one prepreg layer.

8. The structural element according to claim 7, wherein the adhesive layer is made of a thermosetting plastic material, and the prepreg layer is made of a fibre-reinforced thermosetting plastic material.

9. The structural element according to claim 1, wherein the reinforcement profile is a former segment and the strap is adhesively bonded, at least in regions, to at least one of an inner flange and an outer flange of the former segment.

10. The structural element according to claim 9, wherein glass fibres in the plastic material layers of the strap extend parallel to a peripheral direction of the former segment.

11. The structural element according to claim 1, wherein glass fibres in the plurality of fiber reinforced plastic material layers of the strap extend substantially in the direction of a force flux.

* * * * *